United States Patent [19]
Patterson et al.

[11] Patent Number: 5,221,956
[45] Date of Patent: Jun. 22, 1993

[54] LIDAR DEVICE WITH COMBINED OPTICAL SIGHT

[75] Inventors: Scott W. Patterson, Lawrenceville; Mark A. Samuels, Duluth, both of Ga.

[73] Assignee: Kustom Signals, Inc., Lenexa, Kans.

[21] Appl. No.: 744,950

[22] Filed: Aug. 14, 1991

[51] Int. Cl.$^5$ .................................................. G01C 3/08
[52] U.S. Cl. ........................................... 356/28; 356/4; 354/13
[58] Field of Search ..................... 356/4, 28; 359/13

[56] References Cited

U.S. PATENT DOCUMENTS

| | | |
|---|---|---|
| 3,373,441 | 3/1968 | Zadig ........................ 356/5 |
| 3,464,770 | 9/1969 | Schmidt . |
| 3,489,495 | 1/1970 | Blau et al. . |
| 3,517,998 | 6/1970 | Pryor . |
| 3,533,696 | 10/1970 | Winter . |
| 3,542,472 | 11/1970 | Smith-Vaniz . |
| 3,601,491 | 8/1971 | Smith-Vaniz . |
| 3,610,755 | 10/1971 | Wieberger ................... 356/4 |
| 3,661,464 | 5/1972 | Hubbard . |
| 3,690,767 | 9/1972 | Missio et al. . |
| 3,706,093 | 12/1972 | Staeudle . |
| 3,811,774 | 5/1974 | Honeycutt et al. . |
| 3,833,762 | 9/1974 | Gudmundsen . |
| 3,892,483 | 7/1975 | Säufferer . |
| 3,970,389 | 7/1976 | Mendrin et al. . |
| 4,097,148 | 6/1978 | Fry . |
| 4,108,551 | 8/1978 | Weber ........................ 356/4 |
| 4,195,425 | 4/1980 | Leitz et al. . |
| 4,405,230 | 9/1983 | Tew et al. . |
| 4,413,905 | 11/1983 | Holzapfel . |
| 4,457,625 | 7/1984 | Greenleaf et al. . |
| 4,464,115 | 8/1984 | Simpson et al. . |
| 4,491,923 | 1/1985 | Look . |
| 4,552,456 | 11/1985 | Endo . |
| 4,613,231 | 9/1986 | Wichmann . |
| 4,690,550 | 9/1987 | Kühne . |
| 4,721,385 | 1/1988 | Jelalian et al. . |
| 4,721,852 | 1/1988 | Muller . |
| 4,722,601 | 2/1988 | McFarlane .................. 356/152 |
| 4,729,653 | 3/1988 | Kobayashi . |
| 4,733,609 | 3/1988 | Goodwin et al. . |
| 4,738,527 | 4/1988 | McBrien . |
| 4,744,653 | 5/1988 | Sano et al. . |
| 4,787,291 | 11/1988 | Frohock, Jr. . |
| 4,788,441 | 11/1988 | Laskowski . |
| 4,801,201 | 1/1989 | Eichweber . |
| 4,824,251 | 4/1989 | Slotwinski et al. . |
| 4,830,486 | 5/1989 | Goodwin . |
| 4,846,571 | 7/1989 | Jelalian et al. . |
| 4,850,041 | 7/1989 | Roberts et al. . |
| 4,886,353 | 12/1989 | Fondeur . |
| 4,895,441 | 1/1990 | Allen, Jr. . |
| 4,902,125 | 2/1990 | Keene et al. . |
| 4,906,092 | 3/1990 | O'Meara . |
| 5,050,962 | 9/1991 | Monnier et al. ............. 359/13 |

*Primary Examiner*—Mark Hellner
*Attorney, Agent, or Firm*—D. A. N. Chase; Michael Yakimo, Jr.; Richard P. Stitt

[57] ABSTRACT

A laser transmitting and receiving speed and/or range detection device has coaxial internal beam directing and receiving paths for the transmitted and received (reflected) laser energy. A sight is provided having an optical combiner which presents a projected display of the detected speed or range of a target that may be observed by the operator while aiming the device at the target. A telephoto effect is utilized in the projection of the display onto the sight such that the operator need not divert his head from the sight or refocus his eye to read the projected target speed or range.

15 Claims, 5 Drawing Sheets

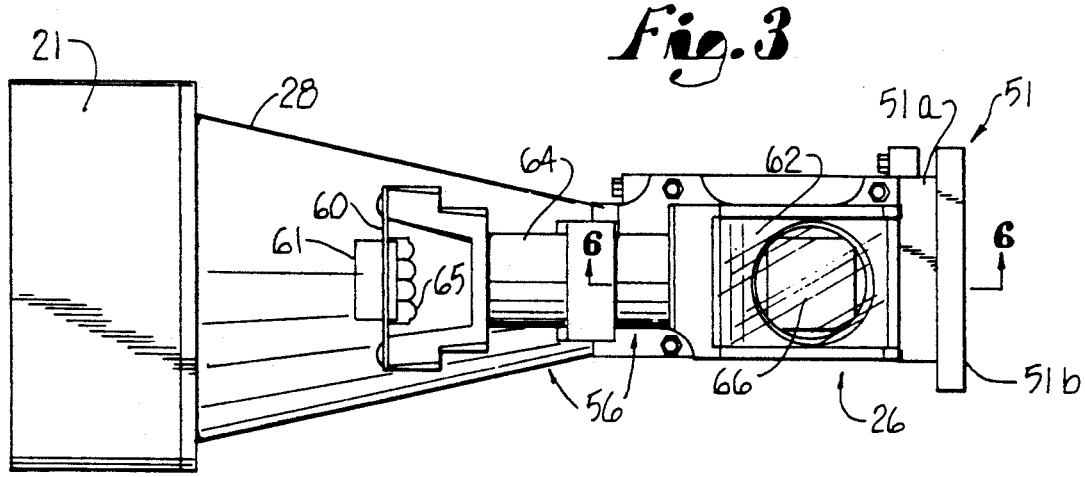
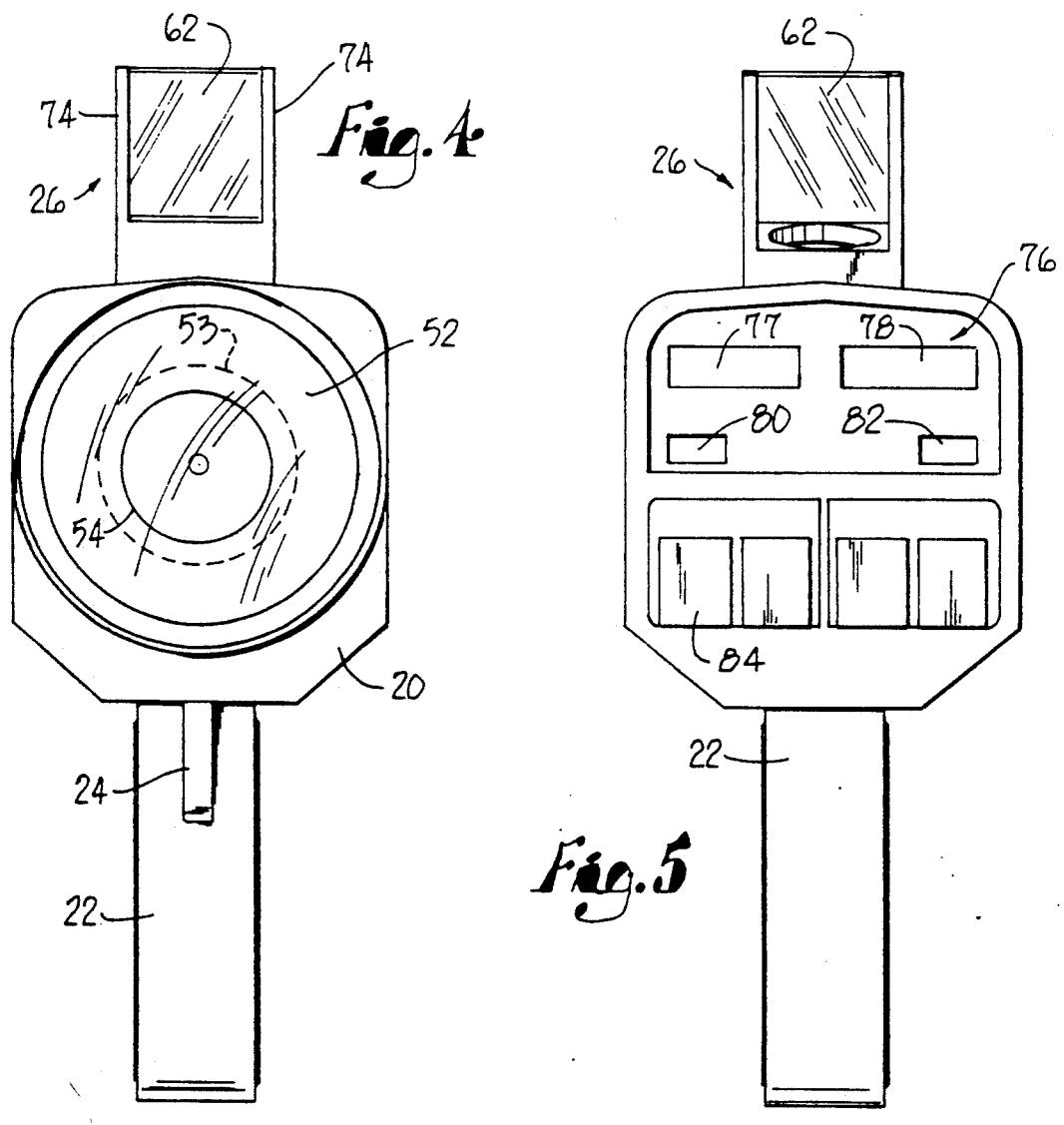

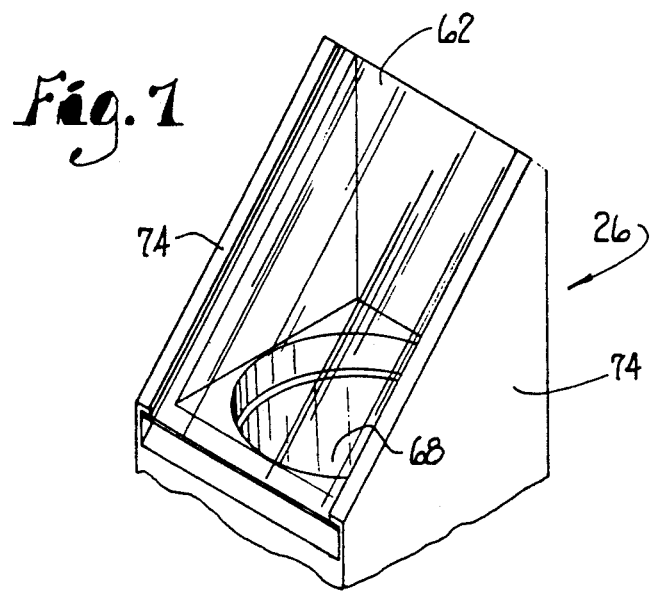
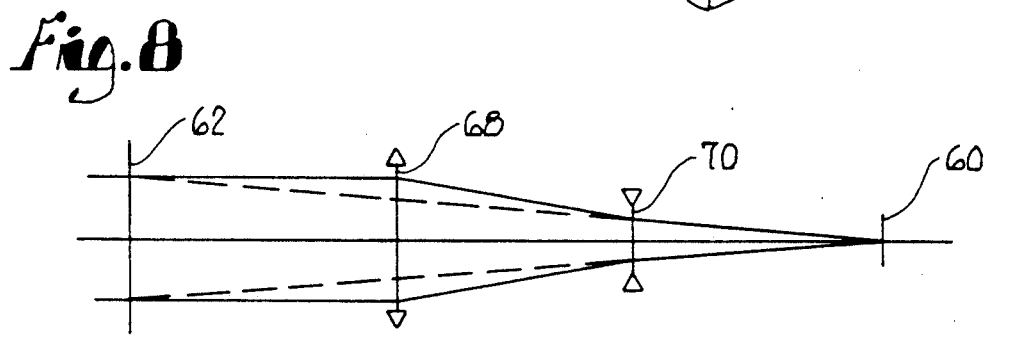
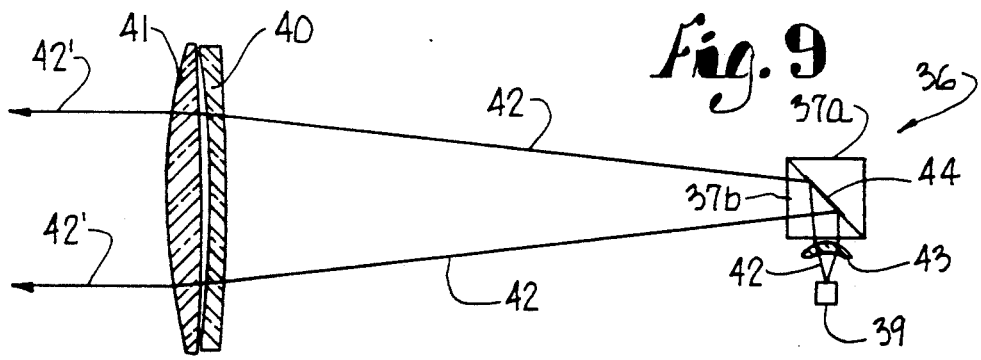
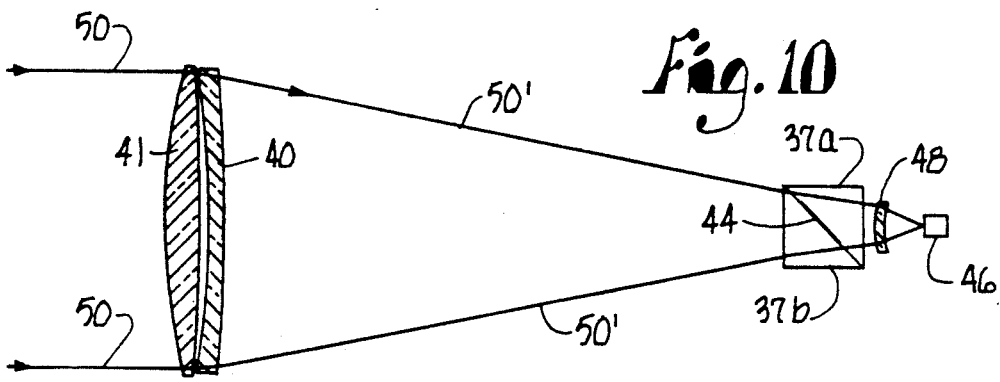

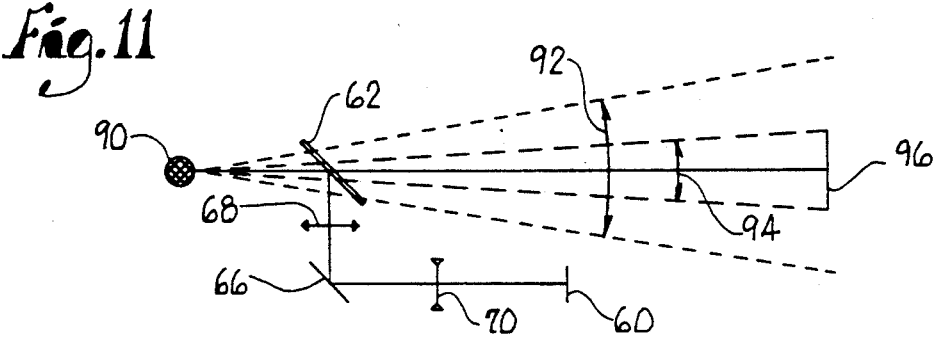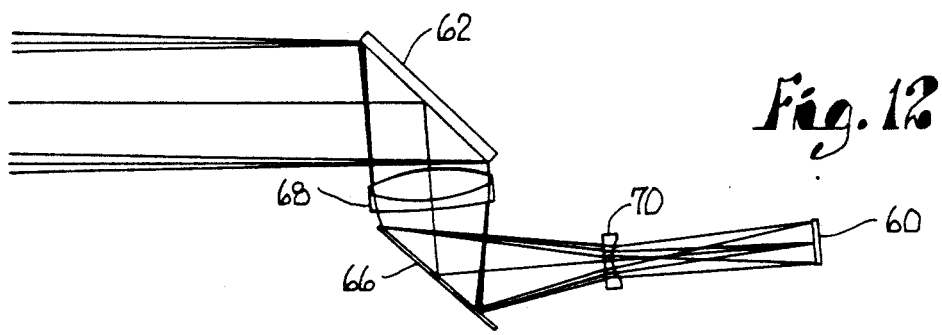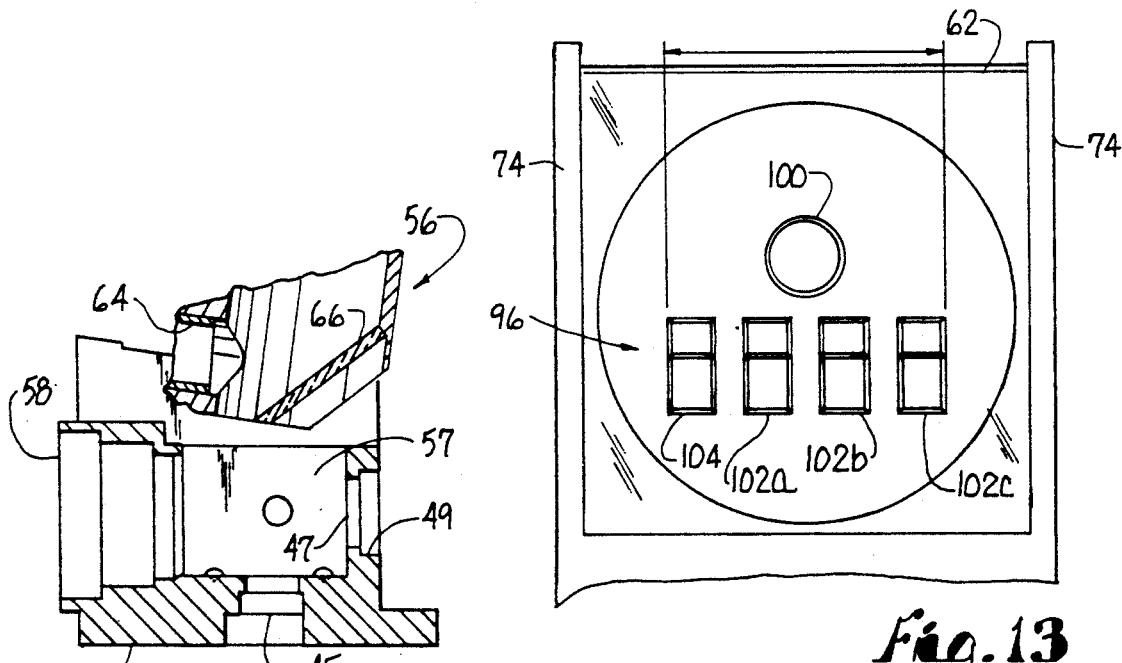

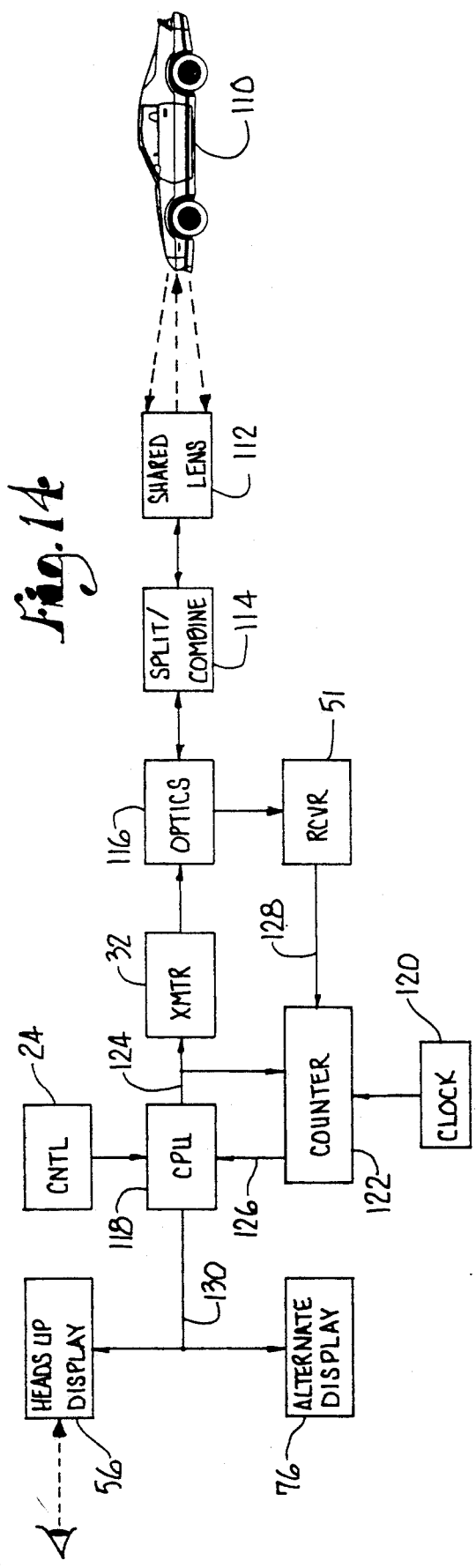
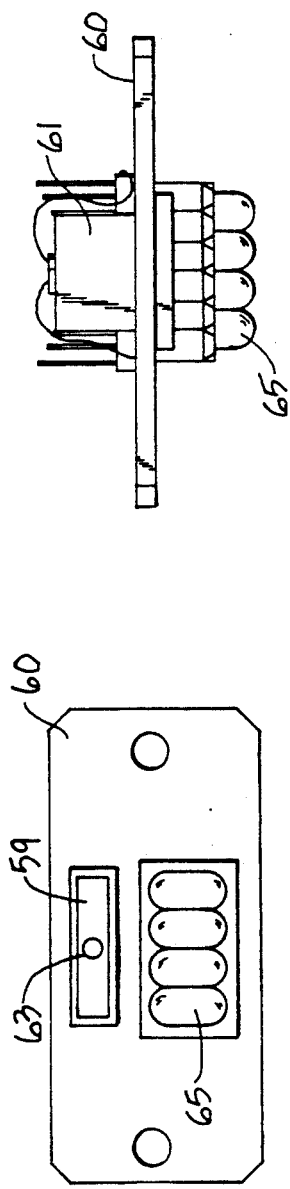

LIDAR DEVICE WITH COMBINED OPTICAL SIGHT

BACKGROUND OF THE INVENTION

This invention relates to a hand-held speed and range detector. More particularly, the present invention relates to a detector utilizing a laser beam capable of being reflected from the surface of a target and which is aimed through the use of a sight that allows simultaneous viewing of the target and the determined velocity or range of the target.

In the field of traffic speed enforcement, two methods of detecting vehicle speed have generally been utilized. The first in use was instrumentation to calculate an average speed between two points by measuring the elapsed time in traversing the predetermined distance. The second method utilizes the doppler effect in radar systems to measure the frequency difference between transmitted and reflected microwave energy.

The first of these systems, the distance/time calculation method involves the inconvenience of determining a distance on the roadway which is then entered into a calculation system in order to determine the speed of the vehicle. Such a procedure is time consuming and inconvenient and eliminates mobility on the part of the traffic officer. In addition, the large measured distance may permit the driver of the target vehicle to modify his speed prior to completion of the measured distance and thereby escape detection. Finally, as the time measurement is often manually started and stopped by the operator the element of human error is added into the accuracy of the speed determination.

The identification of speeding vehicles has long relied upon the use of high frequency radio waves reflected from the surfaces of vehicles to allow a determination of vehicle velocity. While the use of conventional radar systems overcomes the deficiencies of the distance/time method of speed detection, they introduce another set of problems to the determination. The first problem is that the effective beam width of most microwave traffic radar is between 12 and 18 degrees. This wide beam angle covers several lanes of a roadway at the usual operating distances and results in the inability of the radar beam alone to differentiate between individual lanes of traffic and vehicles therein. Also, other objects in the path of the radar beam may reflect the radar energy and provide an inaccurate speed determination of the target vehicle. Therefore, the operator must be able to visually observe the surroundings of the target vehicle during the speed measurement so the operator is able to assert that the surroundings did not interfere with the speed measurement. This contemporaneous awareness of the surrounding environment is denominated as "tracking history" within the art and is required for judicial acceptance of a radar reading as vehicle speed evidence.

A second difficulty presented by the use of conventional microwave traffic radar is the ease with which the radar signal may be detected by radar receiving units in a motorist's vehicle. The proliferation of such "radar detectors" in recent years has allowed many violators to successfully avoid detection.

While the use of laser transmissions for speed detection has been set forth, for example, in U.S. Pat. No. 3,373,441, the device described therein suffers from several difficulties. For example, the device described requires the operator to sight through a viewing tube with the head down.

In addition, the operator's view of the area surrounding the vehicle is obscured by the device during the period of measurement. Therefore, the operator is unable to provide the required "tracking history" to a court for judicial acceptance of the detected speed.

Furthermore, outside the field of traffic speed enforcement, there is a need for a hand-held range detector that may be conveniently and rapidly aimed at small targets such as moving game, small watercraft and the like. In such applications the operator wishes to know the exact distance to the target with the assurance that the target itself, and no an adjacent object or background, is being sensed and measured.

It is, therefore, a general object of the present invention to provide a hand-held laser detection device having pinpoint aiming capability so that the device will not be influenced by the target's surroundings, in order that a rapid and accurate determination of the speed or range of the target may be made.

With respect to traffic speed enforcement, it is an object of the present invention to provide a laser speed detection device which allows the operator to develop a tracking history of the subject vehicle.

It is a further object of the invention to provide a speed or range detector which permits the operator to observe the detected speed or range of the target without diverting his vision from the target.

It is another object of the present invention to provide a speed or range detection device which allows the operator to observe the detected speed or range reading without the need to refocus his eyesight to a second focal point to make such a reading.

Another object of the present invention is to provide a speed or range detection device which will present no parallax as the operator changes head positions with respect to the detection device.

A further object of the present invention is to provide a sight or aiming apparatus for a speed or range detection device which allows the operator to maintain his head in an upright position while simultaneously observing the target and the detected speed or range of the target.

Another object of the present invention is to provide a speed or range detection device which is relatively compact so as to enable it to be easily handled and aimed by an operator.

Another object of the present invention is to provide a laser speed or range detection device having a laser energy transmitting pathway and laser energy reception pathway which are coaxial and concentric.

It is still another object of the present invention to provide a sight for a speed or range detection device which continuously displays the detected velocity or range of the target on the sight.

It is yet another object of the present invention to provide a display showing the detected velocity or range of a target with the display having a relatively short optical path from the sight mechanism of the detector.

Furthermore, it is an object of the present invention to provide a display of the detected speed or range of the target by projection of the determined speed o range along an optical path having an effective focal length substantially greater than the length of the optical path.

The above and further objects and novel features of the invention will more fully appear from the following description when the same is read in conjunction with the accompanying drawings.

BRIEF DESCRIPTION OF THE DRAWINGS

FIG. 3 is a plan view of the apparatus with the case removed and showing the position of the LED circuit board and display;

FIG. 4 is a front end view of the apparatus within its case;

FIG. 5 is a rear end view of the apparatus in its case and showing the combining lens and viewing aperture atop the case;

FIG. 6 is an enlarged, cross sectional, fragmentary detail of the prism housing and a portion of the head-up display module taken along line 6—6 in FIG. 3;

FIG. 7 is a front perspective, detail view of the sight;

FIG. 8 is a schematic diagram of the telephoto optics utilized in the head-up display;

FIG. 9 is a side elevational view of the transmitter pathway lens arrangement and showing the right angle reflection of the transmitted laser beam;

FIG. 10 is a side elevational view of the receiver signal pathway revealing the straight path of travel of the received energy into the detector;

FIG. 11 is a schematic illustration of the head-up display geometry showing the position of the operator's eye and the angle of the total field of view and the angle of the instantaneous-field-of-view, and the projection pathway of the digital velocity (or range) information and reticle image to the combiner lens;

FIG. 12 illustrates in detail the head-up display optics pathway for projection of the digital display and reticle image to the combiner lens from the circuit board containing the display components;

FIG. 13 shows the operator's view through the head-up display and the position of the speed (or range) readout at the lower portion of the combiner lens;

FIG. 14 is a block diagram of the electrical and optical system of the apparatus;

FIG. 15 is an enlarged, elevational view of the face of the circuit board that contains the sighting reticle and digital display, the same being shown removed from the end of the tube upon which it is mounted; and FIG. 16 is a plan view of the circuit board and associated components shown in FIG. 15.

THE TRANSMIT/RECEIVE OPTICS

Figure 1:
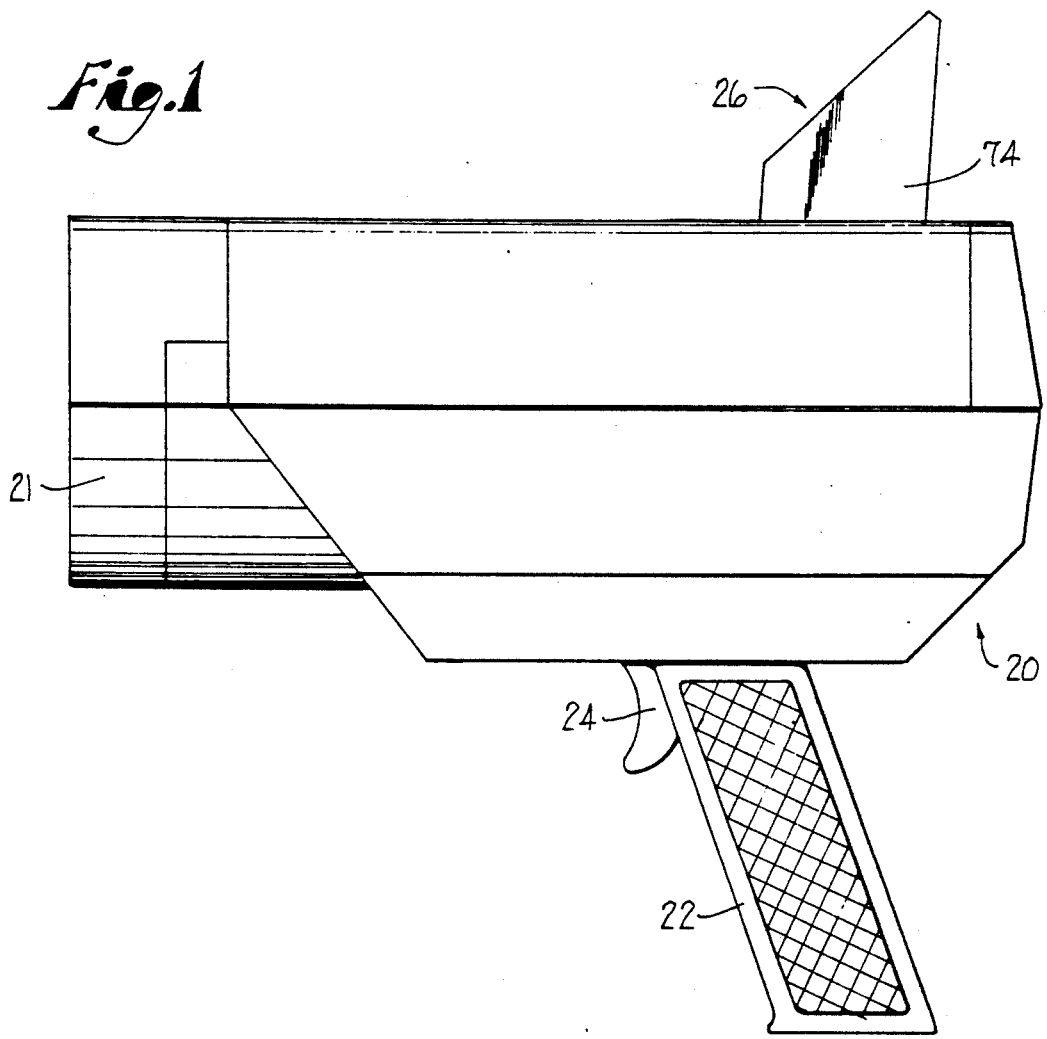
FIG. 1 is a side elevational view of the detector apparatus adapted for traffic speed enforcement showing the handle and trigger mechanism and the upwardly extending viewing and display component.

Reference is made to FIG. 1 showing a side elevational view of the preferred embodiment of the invention. A protective casing 20 encloses the detector optics and electronics of the device. Handle 22 extends below casing 20 and supports the gun-shaped apparatus in the hand of an operator. Trigger 24 protrudes from the front of handle 22. When the operator wishes to activate the device, trigger 24 is depressed inwardly into handle 22. Atop casing 20 is viewer 26 through which a target is sighted by the operator. The combination of casing 20, handle 22 and viewer 26 provides a aiming means and is handled like a hand gun to determine the direction in which the beam of energy transmitted by the device will travel.

Figure 2:
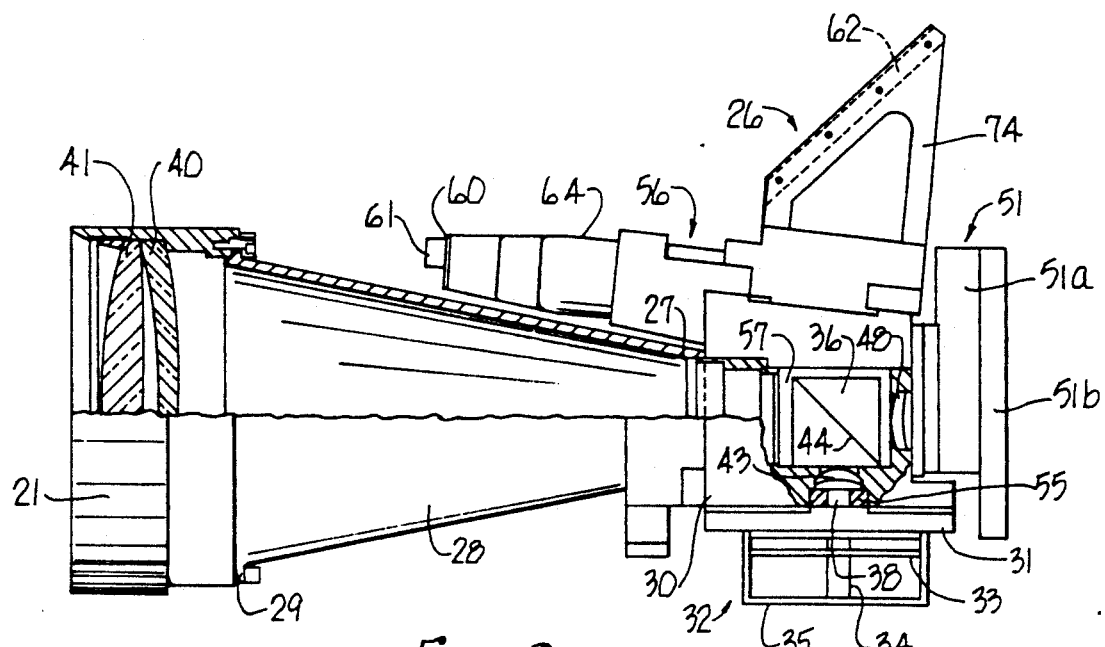
FIG. 2 is a side elevational view of the apparatus with the exterior casing removed, in which a portion of the revealed apparatus is broken away to show the transmitting and receiving lens arrangement.

Referring now to FIG. 2, the casing 20 is removed and certain parts are illustrated in cross section to reveal the mechanical and optical components of the detection device. A directional cone or barrel 28 through which transmitted and received energy passes presents a major component of the device and diverges from its inner end 27 (right end in FIG. 2) to its outer end 29 (left end in FIG. 2) to which a lens assembly 21 is attached. A prism housing 30 is secured to the inner end 27 and has a beam splitter 36 therein which will be discussed in detail below.

A laser transmitter unit 32 includes a base plate 31 mounted on the bottom of the prism housing 30, a transmitter circuit card assembly 33 located beneath the base plate 31 on standoff insulators 34, and a protective cover 35. Connections (not shown) from the circuit card 33 are made through the base plate 31 to a transmitting diode 39 (not shown in FIG. 2) located in the center opening 38 of a locating collar 55 that is inserted into a vertical bore in the housing 30 communicating with the internal chamber 57 in which the beam splitter 36 is located.

The beam splitter 36 has an internal reflective surface 44 to which the transmitted beam 42 (FIG. 9) is directed by a transmitting lens 43 in the vertical bore beneath the beam splitter 36. The surface 44 imparts a 90° angle of reflection to the transmitted beam 42 and directs the beam through the directional cone 28 and lenses 40, 41 in lens assembly 21. The arrangement of lenses 40, 41 reorients beam 42 into a collimated beam 42' (FIG. 9). By collimating beam 42 it is understood that the diverging light waves of beam 42 are reoriented or refracted into light waves having a parallel or nearly parallel direction of travel. In this manner the now parallel waves comprising beam 42' may be directed towards the target.

The transmission pathway for beam 42 is more specifically diagramed in FIG. 9. Beam 42 is illustrated as being emitted from the transmitting diode 39 which is schematically shown. The laser energy is emitted from diode 39 in response to the operation of the laser transmitter of the device, which causes repetitive laser pulses to be emitted as will be more fully described hereinafter in connection with FIG. 14. Approximately 380 pulses per second are emitted from the diode 39, which may be of the gallium-arsenide type. The gallium-arsenide laser produces laser energy having a wave length of 905 nanometers with a peak power output of approximately 50 watts and a 30 to 50 nanosecond pulse width.

Beam splitter 36 comprises two right angle prisms 37a and 37b fitted together and bonded at their diagonal faces to form a cube. The upper right angle prism 37a has an elliptical reflective layer thereon which presents the reflective surface 44. As viewed at 45° angles to surface 44 (upwardly through the center opening 38 or inwardly along the axis of cone 28), the elliptical layer appears circular and thus reflects a transversely circular beam (transmitted beam 42) along the cone 28 to the lenses 40, 41 where the beam is collimated. It may be observed, by a comparison of beam 42 with beam 42', that the lenses 40, 41 cause refraction of beam 42 such that it is formed into parallel lines of travel or collimated.

Again referring to FIG. 2, now in conjunction with FIG. 10, the pathway of reflected laser energy which is received by the device will be described. A portion of the previously transmitted laser energy beam 42' is reflected from a target. The reflected energy 50 is collected through the outer annulus 52 (FIG. 4) of lenses 40, 41. (The broken line circle 53 in FIG. 4 represents the inner boundary of the annulus 52.) As illustrated in FIG. 10 reflected received energy 50 is then refracted by lenses 40, 41 and redirected as beam 50' towards beam splitter 36. The refracted beam 50' passes through beam splitter 36 around the reflective surface 44 to a receiving lens 48 where it is then focused on a photo-transistor detector 46 for subsequent processing of the received energy by the system receiver 51. The receiver unit has a housing 51a mounted on the rear of the prism housing 30 and provided with a cover 51b.

Examining FIG. 2, in conjunction with FIGS. 9 and 10, it may be observed that the pathways of transmission and reception of the laser energy are coaxial with cone 28, transmitted energy beam 42 being directed through an inner circular portion 54 (FIG. 4) of lenses 40, 41 while the received energy is directed through the outer annulus 52. In this manner the device may be constructed in a very compact configuration as the pathway for transmitted and received energy to and from the target is substantially the same.

Referring now to FIG. 6, illustrating an enlarged cross sectional view of prism housing 30 and adjacent module 56 taken along line 6—6 in FIG. 3, the transmitting and receiving energy paths will be described. In FIG. 6 the directional cone 28, transmitting lens 43, receiving lens 48 and beam splitter 36 have been removed for clarity. Transmitting lens 43 (not shown) is fitted within transmitting lens aperture 45 and held in place by collar 55 (FIG. 2). The center opening 38 in the collar 55 permits the transmission of energy from the laser diode towards transmitting lens 43 and into beam splitter 36 (FIG. 2). When energy is being received, it first passes through directional cone 28 (not shown in FIG. 6) into cone aperture 58 which receives the cone's inner end 27, and then on into the beam splitter chamber 57 (FIG. 6). The energy not diverted by reflective surface 44 passes through beam splitter 36 and into receiving aperture 47 whereupon it strikes receiving lens 48 held on receiving lens shoulder 49. The laser energy then strikes the photo-transistor detector 46 (FIG. 10).

Head-up Display

Referring to FIG. 3, the apparatus is illustrated in plan view with outer casing 20 removed to reveal the structure of the head-up display module 56. When utilized for traffic speed enforcement, the head-up display 56 permits the operator to simultaneously view and track a target vehicle through viewer 26 while, at the same time, reading the detected speed of the target vehicle. This is accomplished by projection of an illuminated display of a sighting reticle and of the target vehicle's speed (show in FIG. 13) onto combining lens 62 contained in viewer 26. When used as a rangefinder, the target's range (instead of speed) is projected onto combining lens 62.

A circuit board 60 mounted on the distal end of an axially adjustable tube 64 contains the illuminated sighting reticle and speed or range display which is projected through tube 64. Lenses within tube 64 and at the base of viewer 26 impart a telephoto effect upon the projected display of circuit board 60. When the projected display is observed on combining lens 62 it appears to the operator as though it is located at a substantial distance from the operator's eye or at an infinite focal length. This enables the operator to observe the displayed speed or range of the target without the need to refocus his eye from the focal plane of the target to a second focal plane of the displayed detected speed/range on combiner lens 62.

As is particularly important when the present invention is used in traffic speed enforcement, the operator is not required to shift his field of vision from the view of the target to make a reading of the target vehicle's speed. Such a shifting of the operator's attention would cause a break in the tracking history of the vehicle thus compromising the judicial value of the speed determination. Rather, the tracking history of the vehicle is maintained at all times as the operator is able to view the detected speed of the target vehicle simultaneously with viewing the vehicle as it moves along the roadway. This results in the operator being able to testify regarding surrounding traffic which can compromise the speed reading as well as regarding fixed features of the roadway such as an intervening overpass or road sign which could affect the speed reading.

The projection of the sighting reticle and speed (or range) display of circuit board 60 will now be examined in greater detail. A back lit reticle mounted on the circuit board 60 appears as a projected reticle 100 (FIG. 13) that is observed by the operator as will be subsequently discussed. Referring to FIGS. 15 and 16, the reticle construction comprises a frosted glass 59 on board 60 back lit by a light emitting diode (LED) encased in a housing 61. A transparent circle 63 on the glass 59 provides a ring which is projected. Therefore, the projected reticle 100 (FIG. 13) is circular and provides a form of peep sight for aiming the gun.

For speed enforcement applications, a digital speed display on circuit board 60 is provided by a row of four, seven-segment LEDs 65 which are seen by the operator as projected velocity display digits 102a, 102b, 102c and 104 (FIG. 13). The illuminated reticle and speed display are projected from the circuit board 60 through a lens 70 (FIG. 12) in tube 64. Lens 70 is a diverging lens and in conjunction with compensation lens 68, which is a converging lens, a lengthening of the effective focal length between circuit board 60 and the projected display is achieved. This increase of the effective focal length to a distance well in excess of the actual distance between the circuit board display 60 and the combiner lens 62 enables a standard LED display size to be utilized. Without the use of this telephoto effect a much longer distance between the circuit board display 60 and the combiner lens 62 would be required. When primarily used as a rangefinder, the LEDs 65 provide a digital range display which is projected into the operator's view in the same manner.

Specifically, this utilization of a telephoto lens arrangement between the circuit board display 60 and the combining lens 62 permits us of an inexpensive off-the-shelf commercial LED display 65 as part of circuit board 60. As such off-the-shelf LED displays are intended for direct viewing they are of a much larger size than is optimal for projection onto the combining lens 62. This drawback is overcome through the use of the telephoto lens arrangement in projecting the sighting reticle and speed or range display onto combiner lens 62.

In the preferred embodiment a size of LED display is utilized which would, under normal projection circumstances, require a 300 millimeter focal length between circuit board display 60 and combining lens 62. Such a long focal length would result in an embodiment which would be over 300 millimeters (12 inches) in length. This would present an impractical situation for use of the device as a hand-held instrument. This problem is overcome through the use of the telephoto type optics within the head-up display to achieve the effective 300 millimeter focal length within an actual length of 150 millimeters (approximately 6 inches).

The display from circuit board 60, after passing lens 70, is reflected off of mirror 66 and through compensation lens 68. Compensation lens 68 focuses the projected display of circuit board 60 on combining lens 62. As the display appears on combining lens 62 the speed or range may be observed by the operator without taking his eye from the target which is observable in the viewer. Combining lens 62 is held in place between a pair of upstanding sidewalls 74 of the viewer 26.

As previously indicated, combining lens 62 operates to permit an operator to simultaneously observe the target through the viewer as well as the detected speed or range upon the combining lens itself. This is accomplished by constructing the combining lens such that it offers both transmission of light as well as reflection of light from its surface. Combining lens 62 is essentially a weak mirror that provides a combiner window and therefore does not totally reflect light striking its surface.

In the preferred embodiment the reflectance of combining lens 62 is generally in the range of 25 percent to 50 percent. Variations in the percent reflectance may be made depending upon the degree of contrast expected in the particular use situation for the invention. Where a high brightness background is present, such as snow, a higher degree of reflectance might be preferred to give better contrast between the projected display from circuit board 60 and the view of the target. The utility of variations in the ratio of reflection/transmission of light of the combiner 62 will be apparent to those skilled in the art as the ratio of reflection/transmission will establish the contrast ratio between the reflected display and the viewed background.

Use of the head-up display in the present invention permits the operator to maintain his head in an upright position and view both the target as well as the detected speed or range of the target. The projection of the detected speed/range from circuit board 60 through the optical system in tube 64 permits the operator to view simultaneously a combination of two scenes: first, the outside world beyond the combining lens 62 as combining lens 62 is only semi-reflective; and second, the operator can view the detected display information from the circuit board 60 which has been projected onto the semi-reflective surface of combining lens 62.

This configuration of the head-up display achieves the several objectives of the invention previously set forth. As the projected display information appears on the combining lens 62 the operator can at once view the target and the display without moving his head from the viewer and losing sight of the target and its surroundings. In speed enforcement applications the requirement of presenting a tracking history of the target vehicle is achieved. As may be observed in FIG. 5, viewer sidewalls 74 which support lens 62 are relatively thin. Thus as an operator is sighting on a target vehicle through combining lens 62 the operator will also be able to observe and be aware of the surroundings proximal to the target vehicle as the view is substantially unobstructed by viewer 26.

An alternate display 76 is provided on the back panel of the casing 20 and, in the speed enforcement version of the device, registers the detected speed of the target vehicle at 77 and the detected range at 78, and may be locked-on so as to constantly display the last result of the detection program. LED indicator 80 is illuminated when primary power to the system is on. LED indicator 82 is illuminated when laser pulses are being transmitted. A row of four selector switches 84 control the speed display 77, range display 78, and audio tone and test functions. When the device is used exclusively as a rangefinder, the speed display 77 is omitted.

Referring to FIG. 7, a detailed view of viewer 26 is illustrated with the remainder of the apparatus removed for clarity. Viewer sidewalls 74 are generally triangular in shape with combining lens 62 forming the face of the hypotenuse. This angled position of combining lens 62 permits projection and observation of images from the circuit board 60 (FIG. 3) onto the combining lens 62. Below combining lens 62 is compensation lens 68 through which the images from the circuit board are projected. In FIG. 7 it may be appreciated as discussed above that the thin sidewalls 74 enable the operator to easily maintain awareness of a larger field-of-view than is provided directly through combining lens 62. It is this ability to observe a wider field-of-view which assists the operator in observing the target.

In FIG. 8 a schematic representation of the telephoto concept of the head-up display is illustrated. Circuit board 60 presents an illuminated display including the speed display and the sighting reticle. Light therefrom travels through diverging or negative lens 70 and is then reflected off mirror 66 (not shown) to direct the light through compensation lens 68. The compensation lens 68 is a positive or converging lens and therefore the display from circuit board 60 projected onto combining lens 62 appears as a smaller size than was originally projected from circuit board 60.

Referring now to FIG. 11, the head-up display geometry is detailed. As the eye of observer 90 sights through combining lens 62 two different fields-of-view are presented to operator 90. The first is the total-field-of-view (TFOV) 94. This is the angle of view defined by the distance across the projected numeric display 96 (FIG. 13). The width of total-field-of-view 94 is on the order of 2°. Instantaneous-field-of-view (IFOV) 92 is the angle of view presented by the size of the exit optic or the compensating lens 68 and its apparent distance from the eye. The apparent distance is the perceived distance in front of combiner lens 62 where the projection from compensation lens 68 appears to be located.

This apparent distance in front of the combiner 62 of the display from compensation lens 68 will change as the operator's head position changes. For a head position of approximately 6 to 8 inches distance from the combiner lens 62 a instantaneous-field-of-view of approximate 5° will result. This presents the situation in which the instantaneous-field-of-view is larger than the total-field-of-view and indicates that the operator will have a degree of freedom of head motion. The freedom of head motion results in the operator being able to freeze the gun position at a target and then slightly move his head around while still being able to see the target and have the target validly in the sight.

Referring now to FIG. 13, the operator's view of the display on combiner lens 62 is illustrated. The projected reticle 100 and projected numerical display 96 are shown as positioned on combiner lens 62. The projected reticle 100 allows the operator to sight a target while maintaining his head at a distance of 6 to 8 inches from viewer 26. This distance permits the operator to change the position of his head several inches in any direction while viewing the target and still maintain proper sighting of the target within viewer 26.

For speed enforcement the display of the target vehicle's velocity is accomplished by the projected velocity display digits 102a, 102b, 102c and 104. Digit 104 displays either a minus sign or is not lit. If the target vehicle is traveling towards a stationary operator, digit 104 will appear blank. This indicates that the target vehicle is closing on the operator. However, when the target vehicle is moving away from the operator, digit 104 will display a minus sign indicating that the target vehicle is increasing in distance. Projected velocity digits 102a, 102b and 102c are reserved for displaying the speed of the target vehicle. Digits 102a and 102b are utilized to display speeds of less than 99 mph. When the speed of the target vehicle exceeds 99 mph, velocity digit 102c is used to display the units digit. When the device is employed as a rangefinder, the projected digits 104 and 102a-c display distance in either English or metric units.

The Speed/Range Detection System

The block diagram of FIG. 14 illustrates the implementation of the present invention for speed enforcement use, it being understood that the velocity determination would be excluded when employed as a rangefinder. A target vehicle at which the device is aimed through the viewer 26 is illustrated at 110. Subsystems of the device described hereinabove in detail are referred to functionally in the block diagram of FIG. 14 and denoted shared lens 112, split/combine 114 and optics 116. The shared lens embraces the pair of lenses 40, 41 on the outer end 29 of the direction cone 28 through which transmitted and received energy passes along coaxial paths. The action of the beam splitter 36 is functionally represented at 114, and the transmit path to the reflective surface 44 and the receive path around surface 44 is represented by the optics 116.

The transmitter 32 consists of a pulse generator which fires the diode 39 (FIG. 9) when enabled by command from a microcontroller 118 that is also housed within the casing 20. The transmitter may produce laser pulses approximately 10 nanoseconds to 200 microseconds in duration at a repetition rate of 100 to 5,000 pulses per second. However, as set forth above, the preferred pulse rate from the diode 39 is approximately 380 pulses per second at a pulse width of 30 to 50 nanoseconds.

A 50 MHz crystal oscillator 120 provides a clock for operating a precision counter circuit 122. The counter 122 is enabled by the presence of a trigger pulse on the command line 124 from the microcontroller 118. Range data from the counter is fed to the microcontroller along a data lead 126. The receiver 51 employs a precision comparator which determines that reflected energy from the target vehicle 110 has returned, at which time an output is generated along lead 128 to stop the counter 122. The calculated speed information from the microcontroller appears along output 130 and is fed to both the 7-segment LEDs 65 of the head-up display 56 and the alternate display 76 on the back panel of the casing 20. Range data is also fed to the alternate display 76.

In use, depressing the trigger 24 (FIG. 1) initiates the microcontroller 118 and causes successive trigger pulses to be delivered along command line 124 to the transmitter unit 32 and the counter 122. In addition to originating a laser pulse from the transmitter 32, each trigger pulse initializes the counter 122 which then stores clock pulses until it is stopped by an output from the comparator of the receiver 51. The elapsed time interval is then read into the microcontroller memory via data lead 126.

The microcontroller 118 utilizes software employing a velocity algorithm for computing target speed from successive range determinations. From the round-trip time of a laser pulse from the transmitter 32 to the target vehicle 110 and back to the receiver 51, and the known velocity of infrared light through the atmosphere, the range to the target is calculated. After making a number of such successive range measurements, the range data is analyzed by the processing algorithm by application of a linear regression which yields a velocity determination. If the range to the target increases with time the velocity is designated as a negative value (LED 104, FIG. 13); if the range to the target decreases with time as is the usual case wherein the target vehicle is closing on the speed detector, the velocity is considered positive and LED 104 is not energized.

Operation

When an operator observes a target for which a velocity (or range) determination is desired, the device is aimed at the target. The operator observes the target through viewer 26 and sights on the target through reticle 100 (FIG. 13). With the target sighted in reticle 100, the operator then depresses trigger 24 in handle 22 to activate the microcontroller 118 and repetitively fire the transmitting diode 39. This produces laser pulses at a rate of approximately 380 pulses per second.

The laser pulses emitted from the gallium-arsenide diode pass through transmitting lens 43 and into beam splitter 36 whereupon they strike reflective surface 44 and are deflected at a right angle into directional cone 28. The transmitted beam 42 (FIG. 9) passes through directional cone 28 to lenses 40, 41. The arrangement of lenses 40, 41 represents a collimating arrangement which corrects the diverging directions of travel of the laser energy of beam 42 into parallel waves as illustrated by beam 42'.

The emitted laser beam 42' travels to the target and is reflected therefrom. Some of the reflected energy 50 travels directly back to the device whereupon it reenters the device through outer annulus 52 of lenses 40, 41. The reflected energy 50 (FIG. 10) is then refracted by lenses 40, 41 so as to converge on beam splitter 36. The converging reflected energy 50' then enters beam splitter 36 wherein it passes around reflective surface 44 and into receiving lens 48. The reflected energy 50' is thereby focused on the photo-transistor detector 46 (FIG. 10) of the receiver unit 51.

The elapsed time between transmission of the laser energy from transmitting diode 39 and reception by phototransistor detector 46 is then successively determined and the calculated range is displayed in the rangefinder version of the device. In the speed enforcement version, the velocity of the target vehicle is determined as discussed above with reference to FIG. 14. The velocity/range readout appears on the LED display 65 of circuit board 60 in head-up display module 56. The appropriate display digits 102a, 102b, 102c and 104 are illuminated and projected through the optics of the head-up display and onto combining lens 62 whereupon the target's velocity or range and the target itself are simultaneously observed by the operator.

Having thus described the invention, what is claimed as new and desired to be secured by Letters Patent is:

1. A speed or range detection device comprising:
   means for transmitting a beam of energy, including a laser for generating said beam and a barrel-like aiming component for directing the laser beam axially through said component along a predetermined path of travel,
   a sight on said component presenting a view in a direction generally along said path of travel for aiming said beam at a target,
   means for displaying speed or range information relating to a target,
   processing means connected with said display means and responsive to reflected energy from a target for determining said information and causing said display means to indicate the same,
   means mounting said display means proximal to said sight and establishing a relatively short optical path from the display means to the sight,
   optical means in said optical path providing an effective focal length substantially greater than the length of said optical path and sufficient to cause an image produced by the display means to appear at a distance from the sight that will permit the human eye to focus simultaneously upon said image and a target, and
   said component having inner and outer ends and a pair of coaxial pathways therein for said laser beam and said reflected energy respectively, said transmitting means further including means adjacent said inner end of the component for establishing said pathways for energy from said laser entering said inner end and reflected energy entering said outer end.

2. The device as claimed in claim 1, wherein said pathway established means comprises a beam-splitting device for receiving energy from said laser and redirecting the same along the axis of the said component, and providing a substantially straight, continuing pathway for said reflected energy as it emanates from said inner end of the component.

3. The device as claimed in claim 2, wherein said processing means includes a detector aligned with said continuing pathway for receiving the reflected energy.

4. The device as claimed in claim 1, wherein said means mounting said display means and establishing a relatively short optical path includes a tubular element extending generally along said component a limited distance from said inner end towards said outer end thereof, said tubular element having a distal end portion and said display means being positioned on said end portion of the element, and wherein said optical means establishes said optical path from the display means to the sight along said tubular element and then transversely therefrom into said sight.

5. The device as claimed in claim 4, wherein said optical means includes a telephoto lens arrangement for increasing said effective focal length sufficiently to cause said image produced by the display means to appear at said distance from the sight.

6. The device as claimed in claim 4, wherein said sight has a combiner means therein having forward transmittance generally along said path of travel parallel to said axis of the component and rearward reflectance toward the eye of an operator when the device is in use, whereby the image produced by the display means will be seen by the operator simultaneously with viewing the target.

7. The device as claimed in claim 6, wherein an illuminated reticle is provided associated with said display means, and wherein said optical means causes an image from said reticle to be projected onto said combiner means.

8. The device as claimed in claim 1, wherein said optical means includes a telephoto lens arrangement for increasing said effective focal length sufficiently to cause said image produced by the display means to appear at said distance from the sight.

9. The device as claimed in claim 1, wherein said sight has a combiner means therein for receiving said image and providing forward transmittance generally along said path of travel and rearward reflectance toward the eye of an operator when the device is in use, whereby the image produced by the display means will be seen by the operator simultaneously with viewing the target.

10. A speed or range detection device comprising:
    means for transmitting a beam of energy, including a barrel-like aiming component for directing said beam along a predetermined path of travel,
    a sight on said component having a sighting window providing a view in a forward direction clear of the component generally along said path of travel for aiming said beam at a target, and further having structure defining said window which permits an obstructed view around the window in said forward direction to thereby provide a wide field-of-view for an operator aiming the device,
    means for displaying speed or range information relating to a target and establishing a relatively short optical path from the display means to said sight,
    processing means connected with said display means and responsive to reflected energy from a target for determining said information and causing said display means to indicate the same,
    said sight having a combiner means therein presenting said window for receiving an image from the display means and providing forward transmittance generally along said path of travel and rearward reflectance toward the eye of an operator when the device is in use, whereby the image produced by the display means will be seen by the operator simultaneously with viewing the target, and
    optical means in said optical path providing an effective focal length substantially greater than the length of said optical path and sufficient to cause said image produced by the display means to appear at a distance from the sight that will permit the human eye to focus simultaneously upon said image and the target.

11. The device as claimed in claim 10, wherein said optical means includes a telephoto lens arrangement for increasing said effective focal length sufficiently to cause said image produced by the display means to appear at said distance from the sight.

12. A speed or range detection device comprising:
    means for transmitting a beam of energy, including a laser for generating said beam and a barrel-like aiming component for directing the laser beam axially through said component along a predetermined path of travel, a sight on said component having a sighting window providing a view in a forward direction clear of the component generally along said path of travel for aiming said beam at a target, and further having structure defining said window which permits an obstructed view around the window in said forward direction to thereby provide a wide field-of-view for an operator aiming the device, means for displaying speed or range information relating to a target and establishing an optical path from the display means to said sight, processing means connected with said display means and responsive to reflected energy from a target for determining said information and causing said display means to indicate the same, said sight having a combiner means therein presenting said window for receiving an image from the display means and providing forward transmittance generally along said path of travel and rearward reflectance toward the eye of an operator when the device is in use, whereby the image produced by the display means will be seen by the operator simultaneously with viewing the target, and said component having inner and outer ends and a pair of coaxial pathways therein for said laser beam and said reflected energy respectively, said transmitting means further including means adjacent said inner end of the component for establishing said pathways for energy from said laser entering said inner end and reflected energy entering said outer end.

13. A speed or range detection device comprising:

means for transmitting a beam of energy, including a laser for generating said beam and a barrel-like aiming component for directing the laser beam axially through said component along a predetermined path of travel, a sight on said component presenting a view in a direction generally along said path of travel for aiming said beam at a target, means for displaying speed or range information relating to a target and presenting the displayed information at said sight, processing means connected with said display means and responsive to reflected energy from a target for determining said information and causing said display means to indicate the same, and said component having inner and outer ends and a pair of coaxial pathways therein for said laser beam and said reflected energy respectively, said transmitting means further including means adjacent said inner end of the component for establishing said pathways for energy from said laser entering said inner end and reflected energy entering said outer end.

14. The device as claimed in claim 13, wherein said pathway establishing means comprises a beam-splitting device for receiving energy from said laser and redirecting the same along the axis of said component, and providing a continuing pathway for said reflected energy as it emanates from said inner end of the component.

15. The device as claimed in claim 14, wherein said processing means includes a detector aligned with said continuing pathway for receiving the reflected energy.

* * * * *

UNITED STATES PATENT AND TRADEMARK OFFICE
CERTIFICATE OF CORRECTION

PATENT NO. : 5,221,956
DATED     : June 22, 1993
INVENTOR(S) : Scott W. Patterson and Mark A. Samuels It is certified that error appears in the above-indentified patent and that said Letters Patent is hereby corrected as shown below:

Claim 2, column 11, line 41, after "pathway" delete "established" and insert --establishing--.

Claim 2, column 11, line 43, after "of" delete "the".

Claim 6, column 12, line 1, after "component" insert --,--.

Signed and Sealed this

Eighteenth Day of January, 1994

Attest:

BRUCE LEHMAN

Attesting Officer              Commissioner of Patents and Trademarks

UNITED STATES PATENT AND TRADEMARK OFFICE
CERTIFICATE OF CORRECTION

PATENT NO.        : 5,221,956
APPLICATION NO.   : 07/744950
DATED             : June 22, 1993
INVENTOR(S)       : Scott W. Patterson and Mark A. Samuels It is certified that error appears in the above-identified patent and that said Letters Patent is hereby corrected as shown below:

Claim 10, column 12, line 32, delete "obstructed" and insert --unobstructed--.

Claim 12, column 13, line 6, delete "obstructed" and insert --unobstructed--.

Signed and Sealed this

Twenty-first Day of September, 2010

David J. Kappos
*Director of the United States Patent and Trademark Office*